(12) United States Patent
Tan et al.

(10) Patent No.: US 10,547,541 B2
(45) Date of Patent: Jan. 28, 2020

(54) ROUTE DETERMINING METHOD, AND CORRESPONDING APPARATUS AND SYSTEM

(71) Applicant: HUAWEI TECHNOLOGIES CO., LTD., Shenzhen (CN)

(72) Inventors: Shiyong Tan, Beijing (CN); Xiaoqiang Qiao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/965,849

(22) Filed: Apr. 28, 2018

(65) Prior Publication Data

US 2018/0248790 A1 Aug. 30, 2018

Related U.S. Application Data

(63) Continuation of application No. PCT/CN2015/093525, filed on Oct. 31, 2015.

(51) Int. Cl.
*H04L 12/721* (2013.01)
*H04L 12/841* (2013.01)
(Continued)

(52) U.S. Cl.
CPC ............ *H04L 45/38* (2013.01); *H04L 43/106* (2013.01); *H04L 47/125* (2013.01); *H04L 47/28* (2013.01); *H04L 45/02* (2013.01); *H04L 47/2441* (2013.01)

(58) Field of Classification Search
CPC ..... H04L 43/106; H04L 45/02; H04L 45/306; H04L 45/38; H04L 47/125; H04L 47/2441; H04L 47/28
See application file for complete search history.

(56) References Cited

U.S. PATENT DOCUMENTS

2011/0096668 A1 4/2011 Bloch et al.
2012/0093158 A1 4/2012 Chiba et al.
(Continued)

FOREIGN PATENT DOCUMENTS

CN 103929492 A 7/2014
CN 104153755 A 11/2014
(Continued)

*Primary Examiner* — Ayaz R Sheikh
*Assistant Examiner* — Debebe A Asefa
(74) *Attorney, Agent, or Firm* — Kilpatrick Townsend & Stockton LLP

(57) ABSTRACT

The present disclosure discloses a route determining method, including: receiving a first flow entry which includes a first route mapping relationship and a first load ratio with respect to a full load capacity of each service node; receiving a second flow entry which includes a second route mapping relationship, a second load ratio with respect to a full load capacity of each service node, and a start time of the second flow entry; receiving a first packet of a first service flow; determining, according to a service chain identifier included in the first packet, that the first service flow is a first type of service flow; determining whether a time corresponding to a timestamp precedes the start time of the second flow entry; and if so, determining a service node for receiving the first packet according to the first flow entry; if not, determining a service node for receiving the first packet according to the second flow entry.

15 Claims, 6 Drawing Sheets

(51) Int. Cl.
*H04L 12/26* (2006.01)
*H04L 12/803* (2013.01)
*H04L 12/851* (2013.01)
*H04L 12/751* (2013.01)

(56) References Cited

U.S. PATENT DOCUMENTS

| | | | | |
|---|---|---|---|---|
| 2013/0205037 A1* | 8/2013 | Biswas | ................ | H04L 47/365 709/232 |
| 2014/0119193 A1 | 5/2014 | Anand et al. | | |
| 2015/0085694 A1* | 3/2015 | Agarwal | ................ | H04L 43/04 370/253 |
| 2017/0149660 A1 | 5/2017 | Shu | | |

FOREIGN PATENT DOCUMENTS

| | | | |
|---|---|---|---|
| CN | 104168209 | A | 11/2014 |
| CN | 104219150 | A | 12/2014 |
| CN | 104284385 | A | 1/2015 |
| EP | 1715715 | A1 | 10/2006 |
| EP | 3125505 | A1 | 2/2017 |
| RU | 2556457 | C2 | 7/2015 |

* cited by examiner

ROUTE DETERMINING METHOD, AND CORRESPONDING APPARATUS AND SYSTEM

CROSS-REFERENCE TO RELATED APPLICATIONS

This application is a continuation of International Application No. PCT/CN2015/093525, filed on Oct. 31, 2015, the disclosure of which is hereby incorporated by reference in its entirety.

TECHNICAL FIELD

The present disclosure relates to the field of communications technologies, and in particular, to a route determining method, and a corresponding apparatus and system.

BACKGROUND

In the field of communications technologies, a service flow initiated by a user usually needs to be processed by using multiple types of service functions (SF), and different types of service flows may require different service functions.

In the prior art, different types of service flows are classified into different service chains. SF sequences that each service chain needs to pass through and an order of passing through the SF sequences are defined. Service flows of different service chains need to pass through only corresponding service nodes. During specific implementation, a classifier classifies the service flows initiated by the user, and adds a service chain identifier to a packet of the service flow. Then the classifier sends the packet to a forwarder, and the forwarder determines, according to the service chain identifier included in the packet and a route mapping relationship of the service flow of the service chain, a next service node for receiving the packet.

Actually, a same type of SFs may include multiple service nodes. When the forwarder forwards a packet, load balancing between multiple service nodes of a same type needs to be considered. In addition, dynamic load of the multiple service nodes varies with time. However, the prior art does not provide an efficient and flexible method for implementing service node load balancing.

SUMMARY

Embodiments of this application provide a route determining method, and a corresponding apparatus and system, so as to resolve a prior-art problem that it is difficult to implement service node load balancing efficiently and flexibly.

According to a first aspect, an embodiment provides a route determining method, including:

receiving a first flow entry, where the first flow entry includes a first route mapping relationship of a service flow of a first service chain, a first load ratio with respect to a full load capacity of each service node, and a first effective time period of the first flow entry;

receiving a second flow entry, where the second flow entry includes a second route mapping relationship of the service flow of the first service chain, a second load ratio with respect to a full load capacity of each service node, and a second effective time period of the second flow entry, and the second effective time period is different from the first effective time period;

receiving a first packet of a first service flow, where the first packet includes a first timestamp of the first service flow and a first service chain identifier, the first service chain identifier indicates that the first service flow is a service flow of the first service chain, and the first timestamp indicates a creation time of the first service flow;

determining a time period that includes the first timestamp from the first effective time period and the second effective time period;

determining, according to a flow entry corresponding to the determined time period, a service node for receiving the first packet; and sending the first packet to the determined service node.

In the foregoing implementation, a switch receives the first flow entry and the second flow entry, and determines, according to the timestamp included in the first packet, whether to use the first flow entry or the second flow entry to determine a route for the first packet. Therefore, when a new flow entry is generated because a load status of a service node changes, the switch can immediately use the new flow entry to forward a packet of a newly created service flow, and continue to forward a packet of a previously created service flow based on a previous flow entry. Different from the prior art in which a packet is forwarded according to a new flow entry only after an existing packet is processed, in the solution provided in this embodiment, the switch can adjust a routing policy in a timely manner and implement load balancing more flexibly and quickly. In addition, in the solution provided in this embodiment, a flow entry is generated for a same type of service flows instead of each service flow. Therefore, there are few flow entries, system overheads are relatively low, and efficiency is relatively high.

With reference to the first aspect, in a first possible implementation of the first aspect, after the receiving a second flow entry, the method further includes:

determining whether a start time of the second effective time period precedes an end time of the first effective time period; and if the start time of the second effective time period precedes the end time of the first effective time period, changing the end time of the first effective time period to the start time of the second effective time period.

In the foregoing possible implementation, when the subsequently generated second flow entry is in conflict with the previously generated first flow entry, an effective time of the first flow entry is changed according to an effective time of the second flow entry, to avoid a conflict between the flow entries.

With reference to the first aspect or the first possible implementation of the first aspect, in a second possible implementation of the first aspect, the time period that is determined from the first effective time period and the second effective time period and that includes the first timestamp is the first time period; and the determining, according to the first flow entry, a service node for receiving the first packet includes:

determining at least two service nodes according to an input node of the first packet and the first route mapping relationship;

generating a load balancing factor according to the first timestamp; and determining, from the at least two service nodes according to the respective first load proportions of the at least two service nodes and the load balancing factor, a first service node for receiving the first packet.

With reference to the first aspect or the first possible implementation of the first aspect, in a third possible implementation of the first aspect, the first packet further includes a load balancing factor, and the time period that is determined from the first effective time period and the second effective time period and that includes the first timestamp is the first time period; and the determining, according to the first flow entry, a service node for receiving the first packet includes:

determining at least two service nodes according to an input node of the first packet and the first route mapping relationship; and determining, from the at least two service nodes according to the respective first load proportions of the at least two service nodes and the load balancing factor, a first service node for receiving the first packet.

With reference to the second or the third possible implementation of the first aspect, in a fourth possible implementation of the first aspect, the first packet is a head packet of the first service flow, and after the determining, from the at least two service nodes, a first service node for receiving the first packet, the method further includes:

receiving a second packet of the first service flow; and sending the second packet to the first service node.

In the foregoing possible implementation, a packet subsequent to the head packet of the first service flow is directly forwarded in a routing manner of the head packet of the first service flow, without a need to determine routes for packets of the service flow one by one by means of calculation, so that operation load on the switch is greatly reduced.

With reference to the fourth possible implementation of the first aspect, in a fifth possible implementation of the first aspect, after the determining, from the at least two service nodes, a first service node for receiving the first packet, the method further includes:

starting a timeout timer; and before the sending the second packet to the first service node, the method further includes:

determining that the timeout timer does not expire.

According to a second aspect, an embodiment provides a route determining method, including:

receiving a first packet of a first service flow;

determining, according to a feature field included in the first packet, that the first service flow is a service flow of a first service chain;

adding a first timestamp of the first packet and a first service chain identifier to the first packet, where the first service chain identifier indicates that the first service flow is a service flow of the first service chain, and the first timestamp indicates a creation time of the first service flow; and sending the first packet to a switch.

In the foregoing possible implementation, when classifying and identifying packets of service flows, a classifier adds a timestamp to the packet of the service flow, to add a time attribute to the packet, so that the switch can use different routing policies for packets in different time periods. Therefore, service node load balancing is implemented flexibly and efficiently.

With reference to the second aspect, in a first possible implementation of the second aspect, before the sending the first packet to a switch, the method further includes:

determining a load balancing factor of the first packet, and adding the load balancing factor to the first packet.

According to a third aspect, an embodiment provides a route determining method, including:

obtaining first current load of each service node existing at a first moment;

generating a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node;

sending the first flow entry to a switch;

obtaining second current load of each service node existing at a second moment;

generating a second flow entry, where the second flow entry includes a second route mapping relationship of a packet of the first type of service flow, a second load ratio with respect to a full load capacity of each service node, and a second effective time period of the second flow entry, the second load proportion is generated according to the second current load of each service node, and the second effective time period is different from the first effective time period; and sending the second flow entry to the switch.

In the foregoing possible implementation, when detecting a load change of a service node, a controller can immediately generate the second flow entry, and send the second flow entry to the switch, so that the switch can process an existing packet according to the previous first flow entry, and process a newly created packet according to the second flow entry, thereby implementing load balancing flexibly and efficiently.

According to a fourth aspect, an embodiment provides a route determining apparatus, including:

a first receiving module, configured to: receive a first flow entry, where the first flow entry includes a first route mapping relationship of a service flow of a first service chain, a first load ratio with respect to a full load capacity of each service node, and a first effective time period of the first flow entry; and receive a second flow entry, where the second flow entry includes a second route mapping relationship of the service flow of the first service chain, a second load ratio with respect to a full load capacity of each service node, and a second effective time period of the second flow entry, and the second effective time period is different from the first effective time period;

a second receiving module, configured to receive a first packet of a first service flow, where the first packet includes a first timestamp of the first service flow and a first service chain identifier, the first service chain identifier indicates that the first service flow is a service flow of the first service chain, and the first timestamp indicates a creation time of the first service flow;

a first determining module, configured to determine a time period that includes the first timestamp from the first effective time period and the second effective time period;

a second determining module, configured to determine, according to a flow entry corresponding to the determined time period, a service node for receiving the first packet; and a sending module, configured to send the first packet to the determined service node.

With reference to the fourth aspect, in a first possible implementation of the fourth aspect, the apparatus further includes:

a change module, configured to: after the second flow entry is received, determine whether a start time of the second effective time period precedes an end time of the first effective time period; and when the start time of the second effective time period precedes the end time of the first effective time period, change the end time of the first effective time period to the start time of the second effective time period.

With reference to the fourth aspect or the first possible implementation of the fourth aspect, in a second possible implementation of the fourth aspect, the time period that is determined from the first effective time period and the second effective time period and that includes the first timestamp is the first time period; and the second determining module is in some embodiments configured to:

determine at least two service nodes according to an input node of the first packet and the first route mapping relationship;

generate a load balancing factor according to the first timestamp; and determine, from the at least two service nodes according to the respective first load proportions of the at least two service nodes and the load balancing factor, a first service node for receiving the first packet.

With reference to the fourth aspect or the first possible implementation of the fourth aspect, in a third possible implementation of the fourth aspect, the first packet further includes a load balancing factor, and the time period that is determined from the first effective time period and the second effective time period and that includes the first timestamp is the first time period; and the second determining module is in some embodiments configured to:

determine at least two service nodes according to an input node of the first packet and the first route mapping relationship; and determine, from the at least two service nodes according to the respective first load proportions of the at least two service nodes and the load balancing factor, a first service node for receiving the first packet.

With reference to the second or the third possible implementation of the fourth aspect, in a fourth possible implementation of the fourth aspect, the first packet is a head packet of the first service flow;

the second receiving module is further configured to receive a second packet of the first service flow; and the sending module is further configured to send the second packet to the first service node.

With reference to the fourth possible implementation of the fourth aspect, in a fifth possible implementation of the fourth aspect, the apparatus further includes:

a third determining module, configured to: start a timeout timer after the first service node for receiving the first packet is determined from the at least two service nodes; and before the second packet is sent to the first service node, determine that the timeout timer does not expire.

According to a fifth aspect, an embodiment provides a route determining apparatus, including:

a receiving module, configured to receive a first packet of a first service flow;

a determining module, configured to determine, according to a feature field included in the packet, that the first service flow is a service flow of a first service chain;

an identification module, configured to add a first timestamp of the first packet and a first service chain identifier to the first packet, where the first service chain identifier indicates that the first service flow is a service flow of the first service chain, and the first timestamp indicates a creation time of the first service flow; and a sending module, configured to send the first packet to a switch.

With reference to the fifth aspect, in a first possible implementation of the fifth aspect, the identification module is further configured to: determine a load balancing factor of the first packet, and add the load balancing factor to the first packet.

According to a sixth aspect, an embodiment provides a route determining apparatus, including:

a first obtaining module, configured to obtain first current load of each service node existing at a first moment;

a first generation module, configured to generate a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node;

a sending module, configured to send the first flow entry to a switch;

a second obtaining module, configured to obtain second current load of each service node existing at a second moment; and a second generation module, configured to generate a second flow entry, where the second flow entry includes a second route mapping relationship of a packet of the first type of service flow, a second load ratio with respect to a full load capacity of each service node, and a second effective time period of the second flow entry, the second load proportion is generated according to the second current load of each service node, and the second effective time period is different from the first effective time period, where the sending module is further configured to send the second flow entry to the switch.

According to a seventh aspect, an embodiment provides a route determining device, including:

a receiver, configured to: receive a first flow entry, where the first flow entry includes a first route mapping relationship of a service flow of a first service chain, a first load ratio with respect to a full load capacity of each service node, and a first effective time period of the first flow entry; receive a second flow entry, where the second flow entry includes a second route mapping relationship of the service flow of the first service chain, a second load ratio with respect to a full load capacity of each service node, and a second effective time period of the second flow entry, and the second effective time period is different from the first effective time period; and receive a first packet of a first service flow, where the first packet includes a first timestamp of the first service flow and a first service chain identifier, the first service chain identifier indicates that the first service flow is a service flow of the first service chain, and the first timestamp indicates a creation time of the first service flow;

a processor, configured to: determine a time period that includes the first timestamp from the first effective time period and the second effective time period; and determine, according to a flow entry corresponding to the determined time period, a service node for receiving the first packet; and a transmitter, configured to send the first packet to the determined service node.

With reference to the seventh aspect, in a first possible implementation of the seventh aspect, the processor is further configured to: after the second flow entry is received, determine whether a start time of the second effective time period precedes an end time of the first effective time period; and if the start time of the second effective time period precedes the end time of the first effective time period, change the end time of the first effective time period to the start time of the second effective time period.

With reference to the seventh aspect or the first possible implementation of the seventh aspect, in a second possible implementation of the seventh aspect, the time period that is determined from the first effective time period and the second effective time period and that includes the first timestamp is the first time period; and that the processor is configured to determine, according to the first flow entry, the service node for receiving the first packet includes:

determining at least two service nodes according to an input node of the first packet and the first route mapping relationship;

generating a load balancing factor according to the first timestamp; and determining, from the at least two service nodes according to the respective first load proportions of the at least two service nodes and the load balancing factor, a first service node for receiving the first packet.

With reference to the seventh aspect or the first possible implementation of the seventh aspect, in a third possible implementation of the seventh aspect, the first packet further includes a load balancing factor, and the time period that is determined from the first effective time period and the second effective time period and that includes the first timestamp is the first time period; and that the processor is configured to determine, according to the first flow entry, the service node for receiving the first packet includes:

determining at least two service nodes according to an input node of the first packet and the first route mapping relationship; and determining, from the at least two service nodes according to the respective first load proportions of the at least two service nodes and the load balancing factor, a first service node for receiving the first packet.

With reference to the second or the third possible implementation of the seventh aspect, in a fourth possible implementation of the seventh aspect, the first packet is a head packet of the first service flow;

the receiver is further configured to receive a second packet of the first service flow; and the transmitter is further configured to send the second packet to the first service node.

With reference to the fourth possible implementation of the seventh aspect, in a fifth possible implementation of the seventh aspect, the processor is further configured to: start a timeout timer after the first service node for receiving the first packet is determined from the at least two service nodes; and before the transmitter sends the second packet to the first service node, determine that the timeout timer does not expire.

According to an eighth aspect, an embodiment provides a route determining device, including:

a receiver, configured to receive a first packet of a first service flow;

a processor, configured to: determine, according to a feature field included in the first packet, that the first service flow is a service flow of a first service chain; and add a first timestamp of the first packet and a first service chain identifier to the first packet, where the first service chain identifier indicates that the first service flow is a service flow of the first service chain, and the first timestamp indicates a creation time of the first service flow; and a transmitter, configured to send the first packet to a switch.

With reference to the eighth aspect, in a first possible implementation of the eighth aspect, the processor is further configured to: determine a load balancing factor of the first packet, and add the load balancing factor to the first packet.

According to a ninth aspect, an embodiment provides a route determining device, including:

a receiver, configured to obtain first current load of each service node existing at a first moment;

a processor, configured to generate a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node; and a transmitter, configured to send the first flow entry to a switch, where the receiver is further configured to obtain second current load of each service node existing at a second moment;

the processor is further configured to generate a second flow entry, where the second flow entry includes a second route mapping relationship of a packet of the first type of service flow, a second load ratio with respect to a full load capacity of each service node, and a second effective time period of the second flow entry, the second load proportion is generated according to the second current load of each service node, and the second effective time period is different from the first effective time period; and the transmitter is further configured to send the second flow entry to the switch.

According to a tenth aspect, an embodiment provides a route determining system, including:

a controller, configured to: obtain first current load of each service node existing at a first moment; generate a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node; send the first flow entry to a switch; obtain second current load of each service node existing at a second moment; generate a second flow entry, where the second flow entry includes a second route mapping relationship of a packet of the first type of service flow, a second load ratio with respect to a full load capacity of each service node, and a second effective time period of the second flow entry, and the second load proportion is generated according to the second current load of each service node; and send the second flow entry to the switch, where the second effective time period is different from the first effective time period;

a classifier, configured to: receive a first packet of a first service flow; determine, according to a feature field included in the first packet, that the first service flow is a service flow of the first service chain; add a first timestamp of the first packet and a first service chain identifier to the first packet, where the first service chain identifier indicates that the first service flow is a service flow of the first service chain, and the first timestamp indicates a creation time of the first service flow; and send the first packet to the switch; and the switch, configured to: receive the first flow entry; receive the second flow entry; receive the first packet of the first service flow; determine a time period that includes the first timestamp from the first effective time period and the second effective time period; determine, according to a flow entry corresponding to the determined time period, a service node for receiving the first packet; and send the first packet to the determined service node.

With reference to the tenth aspect, in a first possible implementation of the tenth aspect, the switch is further configured to: after receiving the second flow entry, determine whether a start time of the second effective time period precedes an end time of the first effective time period; and if the start time of the second effective time period precedes the end time of the first effective time period, change the end time of the first effective time period to the start time of the second effective time period.

With reference to the tenth aspect or the first possible implementation of the tenth aspect, the first packet is a head packet of the first service flow; and the switch is further configured to: receive a second packet of the first service flow; and send the second packet to the first service node.

With reference to the tenth aspect, or the first or the second possible implementation of the tenth aspect, in a third possible implementation of the tenth aspect, that the switch is configured to determine, according to the first flow entry, the service node for receiving the first packet includes:

determining at least two service nodes according to an input node of the first packet and the first route mapping relationship;

generating a load balancing factor according to the first timestamp; and determining, from the at least two service nodes according to the respective first load proportions of the at least two service nodes and the load balancing factor, the first service node for receiving the first packet.

With reference to the tenth aspect, or the first or the second possible implementation of the tenth aspect, in a fourth possible implementation of the tenth aspect, the first packet further includes a load balancing factor, and that the switch is configured to determine, according to the first flow entry, the service node for receiving the first packet includes:

determining at least two service nodes according to an input node of the first packet and the first route mapping relationship; and determining, from the at least two service nodes according to the respective first load proportions of the at least two service nodes and the load balancing factor, the first service node for receiving the first packet.

With reference to the second possible implementation of the tenth aspect, in a fifth possible implementation of the tenth aspect, the switch is further configured to start a timeout timer after determining, from the at least two service nodes, the first service node for receiving the first packet; and the switch is further configured to: before sending the second packet to the first service node, determine that the timeout timer does not expire.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following first describes the prior art for ease of understanding the technical solutions in embodiments of this application.

Figure 1:
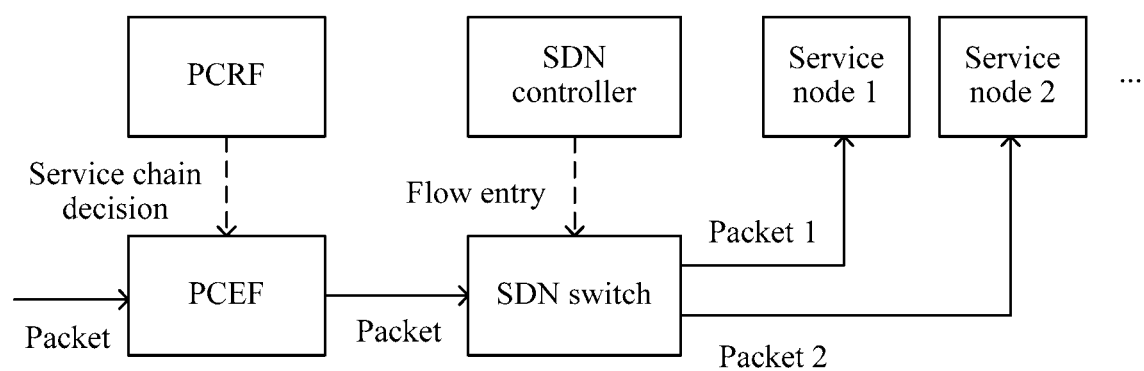
FIG. 1 is a schematic diagram of a packet routing system.

FIG. 1 is a schematic diagram of a system that implements service flow routing and load balancing in an existing mobile broadband network technology. A policy and charging rules function (PCRF) is responsible for a service chain decision function, that is, determines a type of service node that needs to process a type of service flow, and how to classify service flows. A policy and charging enforcement function (PCEF) is configured to: recognize and classify service flows according to a classification rule formulated by the PCRF, and insert, into packets of the service flows, identifiers used to indicate service flow types. A software defined networking (SDN) controller is responsible for obtaining information about each service node and determining a service flow routing policy according to the information about the service node, that is, obtaining service nodes of each type and respective load statuses of the multiple service nodes of each type, and then determining a current service bearer proportion of each service node. An SDN switch is responsible for forwarding the packets of the service flows according to the routing policy determined by the SDN controller.

In the prior art, load balancing is performed on a service node in the following two manners.

Manner 1: The SDN controller obtains information such as a location (a corresponding switch and port), an address, a capacity, and dynamic load of each service node, and 5-tuple information and a service chain identifier (ID), that is, an identifier that indicates a service chain type, of each service flow.

Then the SDN controller generates one flow entry for each service flow according to the information about each service node, determines a service node that each service flow needs to pass through, and sends the generated flow entry to the SDN switch. The SDN switch forwards a packet of the service flow according to the flow entry.

In the manner 1, the SDN controller generates one flow entry for each service flow. Consequently, a quantity of flow entries is quite large, signaling overheads are extremely high, and efficiency is relatively low.

Manner 2: Multiple service chain IDs (for example, 1 to 1000) are allocated to one type of service flows, and when classifying and identifying service flows, the PCEF may allocate different service chain IDs to a same type of service flows.

The SDN controller obtains information such as a location (a corresponding switch and port), an address, a capacity, and dynamic load of each service node, and determines a service flow routing policy according to the information about the service node. For example, there are two service nodes of a type 1, and a capacity ratio between the two service nodes is 1:1. In this case, the SDN controller delivers a flow entry to the SDN switch, to instruct the SDN switch to route packets of service flows with service chain IDs 1 to 500 to a service node 1, and route packets of service flows with service chain IDs 501 to 1000 to a service node 2.

In the manner 2, load balancing is not performed on a service node in a fully flexible manner. For example, if two more service nodes are newly added to the service nodes of the type 1, and capacities of the two service nodes are the same as those of the foregoing two service nodes, packets of service flows with service chain IDs 251 to 500 and 751 to 1000 may be separately transferred to the two new service nodes. However, in the manner 2, such a routing policy change can be performed only after a packet of an existing service flow is forwarded.

Therefore, prior art does not provide an efficient and flexible method for implementing service node load balancing. To resolve this problem, the embodiments of this application provide a route determining method, and a corresponding apparatus and system. The following describes technical solutions of the present disclosure in detail by using the accompanying drawings and specific embodiments. It should be understood that the embodiments of this application and specific features in the embodiments are intended to describe the technical solutions of the present disclosure in detail rather than limit the technical solutions of the present disclosure. In the case of no conflict, the embodiments of this application and the technical features in the embodiments may be mutually combined.

Figure 2A:
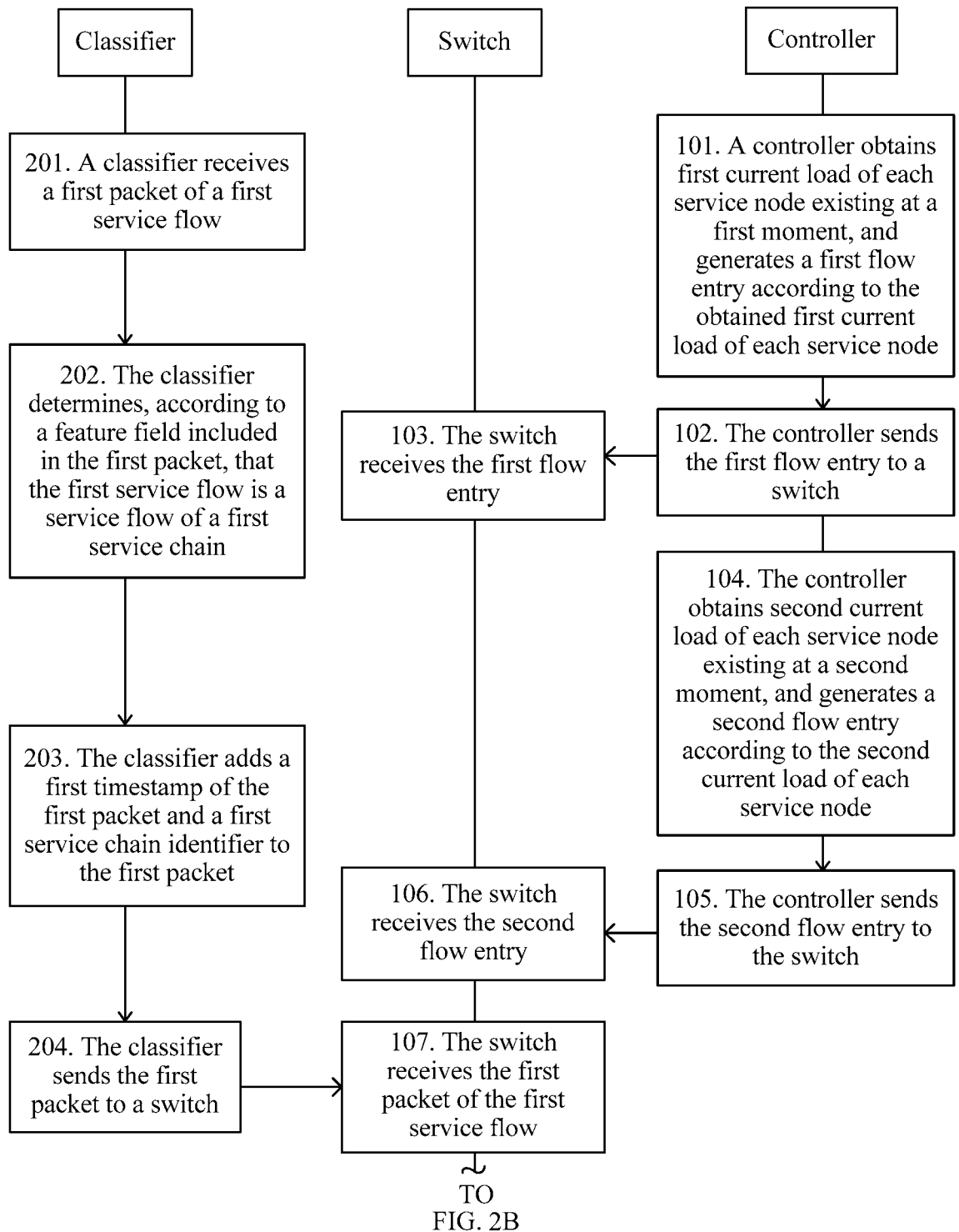
FIG. 2A and FIG. 2B are a schematic flowchart of a route determining method according to an embodiment.
Figure 2B:
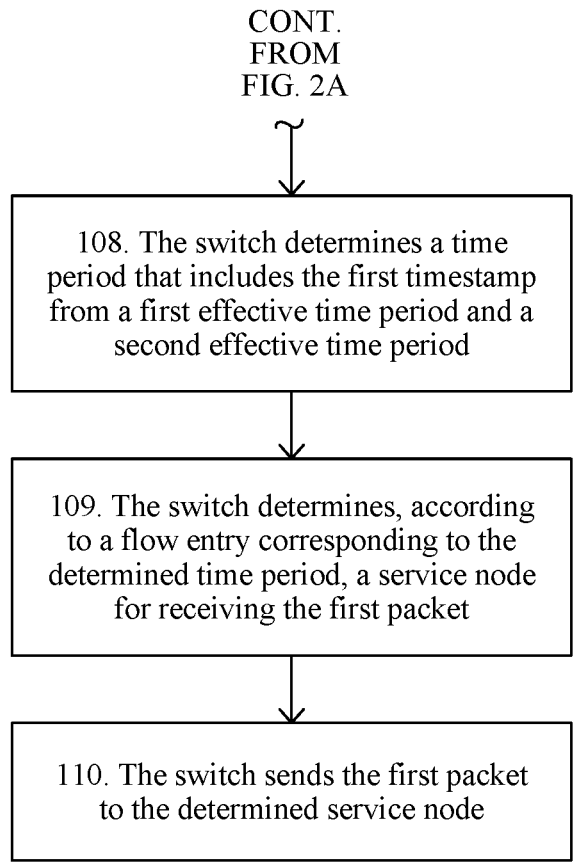

FIG. 2A and FIG. 2B are a schematic flowchart of a route determining method according to this application. The method includes the following steps.

Step 101: A controller obtains first current load of each service node existing at a first moment, and generates a first flow entry according to the obtained first current load of each service node, where the first flow entry includes a first route mapping relationship of a service flow of a first service chain, a first load ratio with respect to a full load capacity of each service node, and a first effective time period of the first flow entry, and the first load proportion is generated according to the first current load of each service node.

Step 102: The controller sends the first flow entry to a switch.

Step 103: The switch receives the first flow entry.

Step 104: The controller obtains second current load of each service node existing at a second moment, and generates a second flow entry according to the second current load of each service node, where the second flow entry includes a second route mapping relationship of a packet of the first type of service flow, a second load ratio with respect to the full load capacity of each service node, and a second effective time period of the second flow entry, the second load proportion is generated according to the second current load of each service node, and the second effective time period is different from the first effective time period.

Step 105: The controller sends the second flow entry to the switch.

Step 106: The switch receives the second flow entry.

Step 107: The switch receives a first packet of a first service flow, where the first packet includes a first timestamp of the first service flow and a first service chain identifier, the first service chain identifier indicates that the first service flow is a service flow of the first service chain, and the first timestamp indicates a creation time of the first service flow.

Step 108: The switch determines a time period that includes the first timestamp from the first effective time period and the second effective time period.

Step 109: The switch determines, according to a flow entry corresponding to the determined time period, a service node for receiving the first packet.

Step 110: The switch sends the first packet to the determined service node.

In some embodiments, the controller separately obtains information about service nodes existing at the first moment and the second moment. The information about the service nodes includes a location, an address, a capacity, and a current load ratio with respect to the full load capacity of each service node. The service nodes at the first moment may not be the same as the service nodes at the second moment. For example, two service nodes of a type 1 are newly added to a system at the second moment, and the service nodes at the second moment include the service nodes at the first moment and the two newly added service nodes.

The controller separately generates the flow entries according to the information about the service nodes existing at the first moment and the second moment. The flow entries include the route mapping relationships of the packet of the first type of service flow and the load ratio with respect to the full capacity of each service node. The first route mapping relationship in the first flow entry and the second route mapping relationship in the second flow entry may be the same, or may be different. This in some embodiments depends on whether service nodes of each type are increased or decreased.

For example, in the first route mapping relationship at the first moment, the packet that is of the first type of service flow and that is sent by a classifier needs to be sent to service nodes of the type 1, and the service nodes of the type 1 include a first service node and a second service node. At the second moment, one service node of the type 1, that is, a third service node is newly added. Therefore, in the second route mapping relationship, the packet that is of the first type of service flow and that is sent by the classifier is mapped to the first service node, the second service node, and the third service node. That is, a route mapping relationship may also change because of an increase or a decrease of service nodes.

In this embodiment, the first load ratio with respect to the full load capacity of the service node is different from the second load ratio with respect to the full load capacity of the service node. This includes the following two cases.

First case: When a route mapping relationship changes because of an increase or a decrease of service nodes, a load ratio with respect to the full load capacity of each service node changes.

Second case: When a route mapping relationship does not change, the controller adjusts a load ratio with respect to the full load capacity of each service node because current load of the service node is imbalanced. The current load of the service node includes a remaining capacity (a current bearable service volume) and a current load ratio with respect to the full load capacity of the service node. That the current load is imbalanced means that the remaining capacity of the service node does not match the current load ratio with respect to the full load capacity of the service node.

For example, in the first route mapping relationship and the second route mapping relationship, all packets of the first type of service flow that are sent by the classifier are mapped to the first service node and the second service node, and remaining capacities of the first service node and the second service node are the same at the first moment. Therefore, the controller sets both first load ratio with respect the full load capacity of the first service node and the second service node to 50%. At the second moment, a remaining capacity of the first service node is twice a remaining capacity of the second service node, and both current load proportions of the first service node and the second service node are 50%. The first service node with a higher service bearer capability has a same load ratio with respect to the full load capacity of the first service node as the second service node with a lower bearer capability, and current load of the first service node and current load of the second service node are imbalanced. To implement load balancing, the controller may adjust a second load ratio with respect to a full load capacity of the first service node to 67%, and adjust a second load ratio with respect to the full load capacity of the second service node to 33%.

Therefore, in this embodiment, at the second moment, when the controller detects a service chain decision change or an increase or a decrease of service nodes, or when the current load of the service node is imbalanced, the controller generates the second flow entry according to the current load of each service node existing at the second moment. The second flow entry includes the second load ratio with respect to the full load capacity of each service node.

In addition, because the controller has generated the first flow entry at the first moment, the second effective time period included in the second flow entry is different from the first effective time period of the first flow entry, to avoid a conflict. A start time of the second flow entry may be the second moment, or may be a time determined by increasing the second moment by one allowance.

In addition, the switch separately receives the first flow entry and the second flow entry sent by the controller, and determines a route for the first type of service flow according to the first flow entry or the second flow entry.

First, the switch receives the first packet of the service flow. The first packet may be from the classifier in the system, for example, a PCEF, a gateway, or a traffic detection function (TDF). Alternatively, the first packet may be from a service node. For example, according to a service chain decision, the packet of the first type of service flow needs to successively pass through a service node that functions as a firewall and a second service node used for cache and acceleration. After passing through the service node that functions as a firewall, the packet needs to be returned to the switch and then forwarded, by using the switch, to the service node used for cache and acceleration.

In this embodiment, the first packet includes the service chain identifier and the first timestamp. The service chain identifier and the first timestamp may be added by the classifier in the system, and the first timestamp may indicate the creation time of the service flow, that is, a time at which the classifier receives a head packet of the first service flow.

The switch determines, according to the service chain identifier included in the first packet, that the first packet is a packet of the first type of service flow, and needs to determine a route for the first packet according to the first flow entry or the second flow entry. The switch further determines whether the first timestamp included in the first packet is included in the first effective time period or the second effective time period. If the first effective time period includes a time corresponding to the first timestamp, the route for the first packet is determined according to the first flow entry. If the second effective time period includes a time corresponding to the first timestamp, the route for the first packet is determined according to the second flow entry.

Actually, the switch may further receive a third flow entry for a routing policy of the service flow of the first service chain. A third effective time period of the third flow entry is different from both the first effective time period and the second effective time period. That is, the switch may receive and store multiple flow entries for a routing policy of service flows of a same service chain, and all effective time periods of the multiple flow entries are different from each other. After receiving a packet of the service flow of the first service chain, the switch selects an applicable flow entry according to a timestamp in the packet.

In the foregoing technical solution in this embodiment, when detecting that the load of the service node is imbalanced, the controller can immediately generate the second flow entry according to the current load of the service node, to instruct the switch to determine, according to the second route mapping relationship and the second load proportion, a route for a packet including a timestamp later than the start time of the second flow entry, so as to implement service node load balancing. Compared with the above-mentioned manner 1 in prior art, in the route determining method provided in this embodiment, a flow entry is generated for each type of service flows instead of each service flow, so that system overheads are greatly reduced. Compared with the above-mentioned manner 2 in prior art, in the route determining method provided in this embodiment, a route determining policy can be adjusted in a timely manner according to a change of the current load of the service node, instead of being adjusted after an existing packet is processed. This is more efficient and flexible.

It should be noted that the controller may be an SDN controller in an SDN network architecture, and the switch may be an SDN switch in the SDN network architecture. If the SDN network architecture is not used, step 101, step 102, step 104, and step 105 may be performed by a network element that has a function the same as or similar to that of the SDN controller in the SDN network architecture, and step 103, and step 106 to step 110 may be performed by a network element that has a function the same as or similar to that of the SDN switch in the SDN network architecture. In addition, in another network architecture, alternatively, functions of the controller and the switch may be integrated into one network element.

In some embodiments, in this embodiment, after the switch receives the second flow entry in step 106, the method further includes the following steps:

determining whether a start time of the second effective time period precedes an end time of the first effective time period; and if the start time of the second effective time period precedes the end time of the first effective time period, changing the end time of the first effective time period to the start time of the second effective time period. In some embodiments, a flow entry delivered by the controller to the switch may further include an effective time period field used to indicate an effective time of the flow entry. If an effective time period of a subsequently received (generated) flow entry overlaps an effective time period of a previously received (generated) flow entry, a route for a packet including a timestamp that falls within an overlapping time period is determined by using a policy defined in the subsequent flow entry, to respond to a latest routing policy and quickly implement load balancing.

Actually, during generation of a flow entry, an effective time period field in the flow entry may be default, or may have a blank value, to indicate that the flow entry is always effective.

In some embodiments, in this embodiment, the time period that is determined from the first effective time period and the second effective time period and that includes the first timestamp is the first time period.

Figure 3:
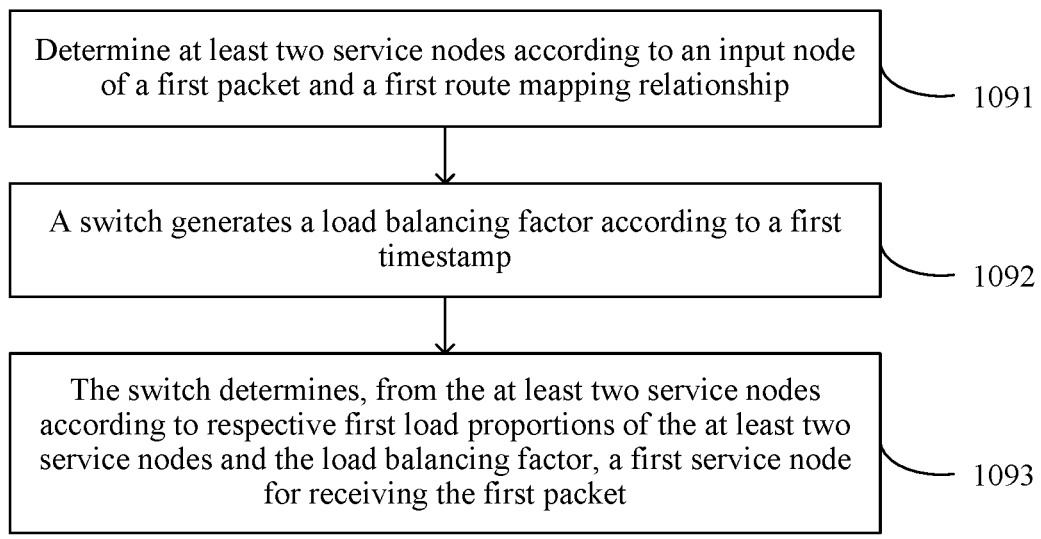
FIG. 3 is a schematic flowchart of a further detailed route determining method according to an embodiment.

Referring to FIG. 3, step 109 in which the switch in some embodiments determines, according to the first flow entry, the service node for receiving the first packet includes the following steps.

Step 1091: Determine at least two service nodes according to an input node of the first packet and the first route mapping relationship.

Step 1092: The switch generates a load balancing factor according to the first timestamp.

Step 1093: The switch determines, from the at least two service nodes according to respective first load proportions of the at least two service nodes and the load balancing factor, a first service node for receiving the first packet.

In some embodiments, the route mapping relationship included in the flow entry is a mapping relationship between an input node and an output node of the packet of the first type of service flow, that is, indicates a service node to which the switch needs to forward a packet received from a first input node. The load proportions of the service nodes that are included in the flow entry are respective service bearer proportions of the at least two service nodes determined according to the route mapping relationship.

For example, a possible form of the flow entry may be:
"Match: InPort=0, SC-ID=1, $T_1 \leq \text{TimeStamp} < T_2$.
Output: OutPort=1, Ratio=50%; OutPort=2, Ratio=50%."

The Match paragraph includes information about a packet and a flow entry. InPort is a port identifier of an input node, SC-ID is a service chain identifier, and is also referred to as a service chain ID, and the TimeStamp field indicates that an effective time period of the flow entry is $[T_1, T_2)$. As described above, the TimeStamp field may be default. The Output paragraph includes information about an output node. OutPort is an identifier of an output port, and Ratio is a load proportion corresponding to the output port. The foregoing flow entry indicates that packets that are input from a port 0 are sent to a port 1 or a port 2, and load proportions of the port 1 and the port 2 are the same, that is, the packets are equally distributed to the port 1 and the port 2.

In step 1091, the switch obtains an identifier of the input node of the first packet, and determines, according to the identifier of the input node and the route mapping relationship in the first flow entry, the at least two service nodes that may be used for receiving the first packet.

Then the switch generates the load balancing factor according to the first timestamp in the first packet, and determines, from the at least two service nodes (the service nodes determined in step 1091) with reference to the respective load proportions of the at least two service nodes in the first flow entry and the load balancing factor, the first service node for receiving the first packet.

During specific implementation, step 1093 includes the following manners.

Manner 1: The switch calculates a hash value of the timestamp, uses the calculated hash value as the load balancing factor, and determines, with reference to the hash value and the load proportions of the service nodes, the service node for receiving the packet.

For example, two possible output service nodes determined according to the first route mapping relationship are a service node 1 and a service node 2, and load proportions of the two service nodes are 50%. In this case, after the hash value is calculated according to the timestamp, if the hash value is an odd number, the packet is sent to the service node 1. If the hash value is an even number, the packet is sent to the service node 2. Alternatively, an intermediate value is determined. If the hash value is greater than the intermediate value, the packet is sent to the service node 1. If the hash value is not greater than the intermediate value, the packet is sent to the service node 2.

Manner 2: The switch may alternatively use the timestamp as the load balancing factor, and determine, according to the timestamp and the load proportions of the service nodes, the service node for receiving the packet.

Still in an example in which the load proportions of both the service node 1 and the service node 2 are 50%, if the last digit of the timestamp is an odd number, the packet is sent to the service node 1. If the last digit of the timestamp is an even number, the packet is sent to the service node 2. Alternatively, a packet including a timestamp that within a range $[T_1, T_1+T)$ is sent to the service node 1, a packet including a timestamp that falls within a range $[T_1+T, T_1+2T)$ is sent to the service node 2, a packet including a timestamp that falls within a range $[T_1+2T, T_1+3T)$ is sent to the service node 1, and so on.

Manner 3: The switch generates the load balancing factor according to information unrelated to the timestamp, and determines, according to the load balancing factor and the load proportions of the service nodes, the service node for receiving the packet.

For example, the switch consecutively numbers a first type of service flows in ascending order, and a number corresponding to each service flow is a load balancing factor of a packet of the service flow. For example, the switch numbers the first received first type of service flow 1, numbers the second received first type of service flow 2, . . . , and numbers the tenth received first type of service flow 10, and then numbers service flows from 1 again. Still in an example in which the load proportions of both the service node 1 and the service node 2 are 50%, a packet numbered an odd number may be sent to the service node 1, and a packet numbered an even number may be sent to the service node 2. Alternatively, a packet whose number falls within a range [1, 5] may be sent to the service node 1, and a packet whose number falls within a range [6, 10] may be sent to the service node 2.

It should be noted that, only several possible implementations of determining, according to the load balancing factor and the load proportions of the service nodes, the service node for receiving the packet are listed above, and persons skilled in the art may determine, in another possible implementation in the prior art, the service node for receiving the packet. No further examples are listed herein one by one in this embodiment.

In some embodiments, in this embodiment, the first packet includes the load balancing factor, and the time period that is determined from the first effective time period and the second effective time period and that includes the first timestamp is the first time period.

Step 109 in which the switch in some embodiments determines, according to the first flow entry, the service node for receiving the first packet includes the following steps.

Step 1091: The switch determines at least two service nodes according to an input node of the first packet and the first route mapping relationship.

Step 1093: The switch determines, from the at least two service nodes according to respective first load proportions of the at least two service nodes and a load balancing factor, a first service node for receiving the first packet.

In some embodiments, when identifying packets of service flows, the classifier may calculate a load balancing factor of a packet, and adds the load balancing factor to the packet. The switch directly obtains the load balancing factor from the packet without calculating the load balancing factor, and determines the service node for receiving the packet. For a manner in which the classifier calculates the load balancing factor and an implementation of step 1093, refer to the foregoing manner 1, manner 2, and manner 3, and details are not described herein again.

In the foregoing technical solution, the load balancing factor is added to the packet, so that the switch does not need to calculate the load balancing factor. This reduces load on the switch.

It should be noted that, in the foregoing two implementations of step 109, the first load ratio with respect to the full load capacity of the service node that is included in the first flow entry may be represented in a form of the "Ratio" field in the foregoing example, that is, a corresponding service bearer proportion of the service node. The first load ratio with respect to the full load capacity of the service node may be directly a range of a load balancing factor corresponding to the service node. For example, a first load ratio with respect to a full load capacity of the service node 1 may be represented as "LB≤Max/2", and a first load ratio with respect to a full load capacity of the service node 2 may be represented as "Max/2<LB≤Max". LB is a load balancing factor.

In addition, in the technical solution in this embodiment, there may be multiple switches. After being processed by the first service node, the first packet needs to be returned to the switch and forwarded by the switch to a next service node. A switch that sends the first packet to the first service node and a switch that receives the packet sent by the first service node may be the same, or may be different. In this embodiment, if an algorithm of the load balancing factor is uniform, packet route consistency can be ensured even if a switch is switched.

In some embodiments, in this embodiment, the first packet is the head packet of the first service flow. After step 1093 in which the switch determines, from the at least two service nodes, the first service node for receiving the first packet, the method further includes the following steps.

Step 111: The switch receives a second packet of the first service flow.

Step 112: The switch sends the second packet to the first service node.

In some embodiments, because all packets of the first service flow have a same forwarding path, after determining that a service node for receiving the head packet of the first service flow is the first service node, the switch directly sends a packet subsequent to the head packet of the first service flow to the first service node, without determining routes for packets one by one according to a load proportion and a route mapping relationship.

During specific implementation, after determining that the service node for receiving the head packet of the first service flow is the first service node, the switch may generate a new flow entry, and defines, in the new flow entry, that a packet of the first service flow is to be sent to the first service node. After receiving the subsequent packet of the first service flow, the switch may directly forward the packet to the first service node according to the new flow entry, without performing step 1093 to determine a next service node for receiving the packet.

Step 111 and step 112 are applicable not only to the technical solution of determining a route for the packet when the first packet does not include the load balancing factor, but also to the technical solution of determining a route for the packet when the first packet includes the load balancing factor. The packet subsequent to the head packet of the first service flow is directly forwarded in a routing manner of the head packet of the first service flow, without a need to determine routes for packets of the service flow one by one by means of calculation, so that operation load on the switch is greatly reduced.

Figure 4:
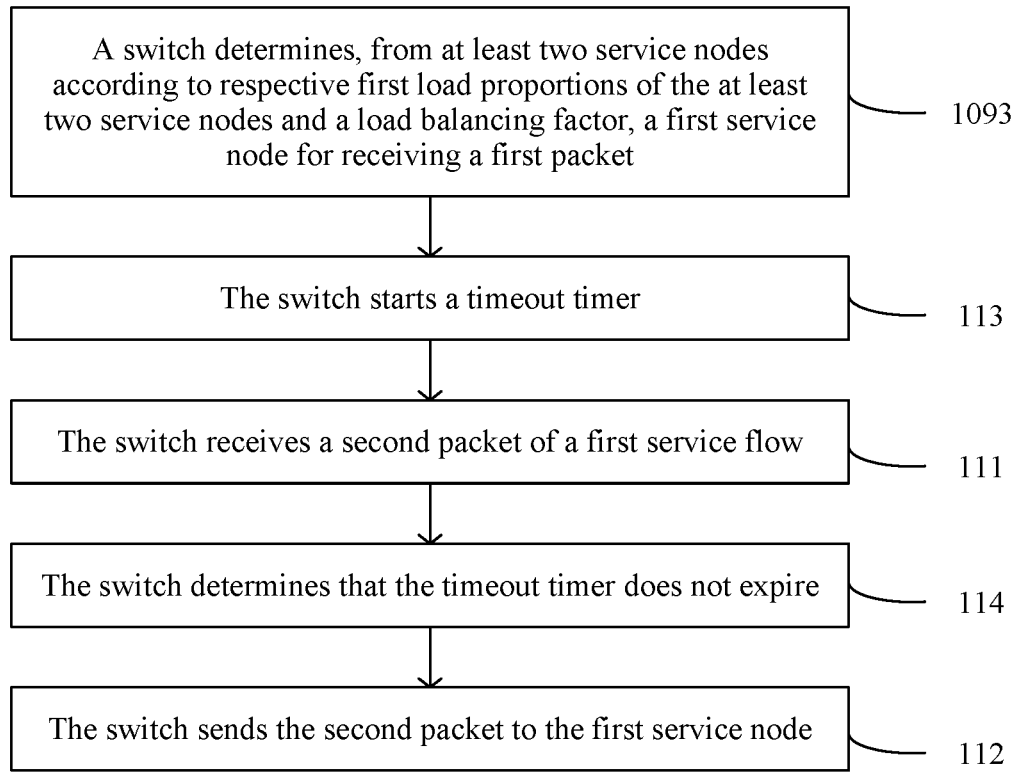
FIG. 4 is another schematic flowchart of a route determining method according to an embodiment.

In some embodiments, in this embodiment, referring to FIG. 4, after step 1093 in which the switch determines, from the at least two service nodes, the first service node for receiving the first packet, the method further includes the following step.

Step 113: The switch starts a timeout timer.

Before step 112 in which the switch sends the second packet to the first service node, the method further includes the following step.

Step 114: The switch determines that the timeout timer does not expire.

In some embodiments, when the packet is directly forwarded in the manner in step 111 to step 113, the timeout timer is set. Before the timeout timer expires, a non-head packet of the first service flow is forwarded by performing step 111 and step 112.

After the timeout timer expires, the packet may be forwarded in the following manner.

First manner: At a moment at which the timeout timer expires, it is determined whether there is a to-be-processed (to-be-forwarded) packet of the first service flow. If there is a to-be-processed (to-be-forwarded) packet, the timer is reset, and the timeout timer is canceled until there is no packet of the first service flow when the timeout timer expires.

Second manner: For a first packet after the timeout timer expires, a service node for receiving the first packet is determined in a manner in step 1093, then a new timeout timer is created, and step 114 and step 112 are performed. The previous timeout timer may be canceled.

The foregoing technical solution is intended to achieve the following purpose: As described above, step 111 and step 112 are usually performed by using a newly created flow entry, and in the foregoing solution in which the timeout timer is used, the newly created flow entry may be aged, and after packets of the first service flow are processed, the newly created flow entry is deleted, so that a quantity of flow entries is reduced, and overheads are reduced.

Based on a same inventive concept, an embodiment further provides a route determining method. Still referring to FIG. 2A and FIG. 2B, the method includes the following steps.

Step 201: A classifier receives a first packet of a first service flow.

Step 202: The classifier determines, according to a feature field included in the first packet, that the first service flow is a service flow of a first service chain.

Step 203: The classifier adds a first timestamp of the first packet and a first service chain identifier to the first packet, where the first service chain identifier indicates that the first service flow is a service flow of the first service chain, and the first timestamp indicates a creation time of the first service flow.

Step 204: The classifier sends the first packet to a switch.

In some embodiments, step 201 to step 204 may be performed by the classifier in a service chain architecture. The classifier may be in some embodiments a PCEF, a gateway, a TDF, or the like. Actually, step 201 to step 204 may be performed by another network element that has a function the same as or similar to that of the classifier in the service chain architecture.

In this embodiment, the classifier classifies and identifies service flows according to a service chain decision policy. The service chain decision policy includes a rule for identifying the service flows, and the rule is generated by a PCRF in the service chain architecture, and is obtained by the classifier from the PCRF. In some embodiments, there may be a PUSH mode or a PULL mode. The PUSH mode means that the PCRF actively pushes a rule for classifying user-related service flows into service chains to the classifier, and the PULL mode means that after receiving a service flow initiated by a user, the classifier pulls a corresponding service chain decision policy from the PCRF.

In the foregoing technical solution, when classifying and identifying packets of service flows, the classifier adds a timestamp to the packet of the service flow, to add a time attribute to the packet, so that the switch can use different routing policies for packets in different time periods. Therefore, service node load balancing is implemented flexibly and efficiently.

In addition, in the foregoing technical solution in this embodiment, a controller and the switch perform service flow service chain decision, service flow recognition, service flow identification, and service flow route decoupling, and implement a load balancing policy, without exchanging signaling with the PCRF or the classifier, so that network efficiency is improved.

In some embodiments, in this embodiment, before step 204, the method further includes the following step.

Step 205: The classifier determines a load balancing factor of the first packet, and adds the load balancing factor to the first packet.

In some embodiments, the classifier may calculate the load balancing factor of the packet according to the timestamp, or may generate the load balancing factor of the packet according to other information unrelated to the timestamp. An implementation thereof is similar to the manner 1, the manner 2, and the manner 3 in step 1093, and details are not described herein again.

The classifier adds the load balancing factor to the packet, so that operation load on the switch can be reduced.

Figure 5:
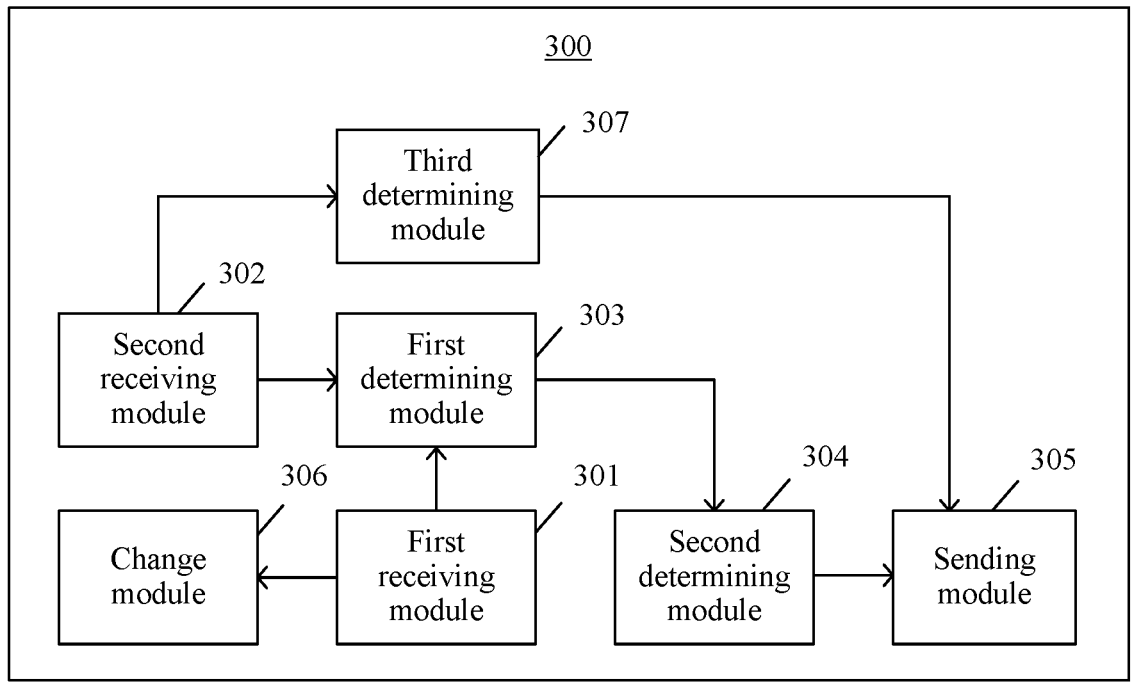
FIG. 5 is a schematic structural block diagram of a route determining apparatus 300 according to an embodiment.

Based on a same technical concept, an embodiment further provides a route determining apparatus 300. Referring to FIG. 5, the apparatus 300 includes:

a first receiving module 301, configured to: receive a first flow entry, where the first flow entry includes a first route mapping relationship of a service flow of a first service chain, a first load ratio with respect to a full load capacity of each service node, and a first effective time period of the first flow entry; and receive a second flow entry, where the second flow entry includes a second route mapping relationship of the service flow of the first service chain, a second load ratio with respect to a full load capacity of each service node, and a second effective time period of the second flow entry, and the second effective time period is different from the first effective time period;

a second receiving module 302, configured to receive a first packet of a first service flow, where the first packet includes a first timestamp of the first service flow and a first service chain identifier, the first service chain identifier indicates that the first service flow is a service flow of the first service chain, and the first timestamp indicates a creation time of the first service flow;

a first determining module 303, configured to determine a time period that includes the first timestamp from the first effective time period and the second effective time period;

a second determining module 304, configured to determine, according to a flow entry corresponding to the determined time period, a service node for receiving the first packet; and a sending module 305, configured to send the first packet to the determined service node.

In some embodiments, in this embodiment, the apparatus further includes:

a change module 306, configured to: after the second flow entry is received, determine whether a start time of the second effective time period precedes an end time of the first effective time period; and when the start time of the second effective time period precedes the end time of the first effective time period, change the end time of the first effective time period to the start time of the second effective time period.

In some embodiments, in this embodiment, the time period that is determined from the first effective time period and the second effective time period and that includes the first timestamp is the first time period.

The second determining module 304 is in some embodiments configured to:

determine at least two service nodes according to an input node of the first packet and the first route mapping relationship;

generate a load balancing factor according to the first timestamp; and determine, from the at least two service nodes according to the respective first load proportions of the at least two service nodes and the load balancing factor, a first service node for receiving the first packet.

In some embodiments, in this embodiment, the first packet further includes a load balancing factor, and the time period that is determined from the first effective time period and the second effective time period and that includes the first timestamp is the first time period.

The second determining module 304 is in some embodiments configured to:

determine at least two service nodes according to an input node of the first packet and the first route mapping relationship; and determine, from the at least two service nodes according to the respective first load proportions of the at least two service nodes and the load balancing factor, a first service node for receiving the first packet.

In some embodiments, in this embodiment, the first packet is a head packet of the first service flow.

The second receiving module 302 is further configured to receive a second packet of the first service flow.

The sending module 305 is further configured to send the second packet to the first service node.

In some embodiments, in this embodiment, the apparatus further includes:

a third determining module 307, configured to: start a timeout timer after the first service node for receiving the first packet is determined from the at least two service nodes; and before the second packet is sent to the first service node, determine that the timeout timer does not expire.

The apparatus 300 in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the apparatus 300 in this embodiment according to the foregoing description. For conciseness of this specification, details are not described herein again.

Figure 6:
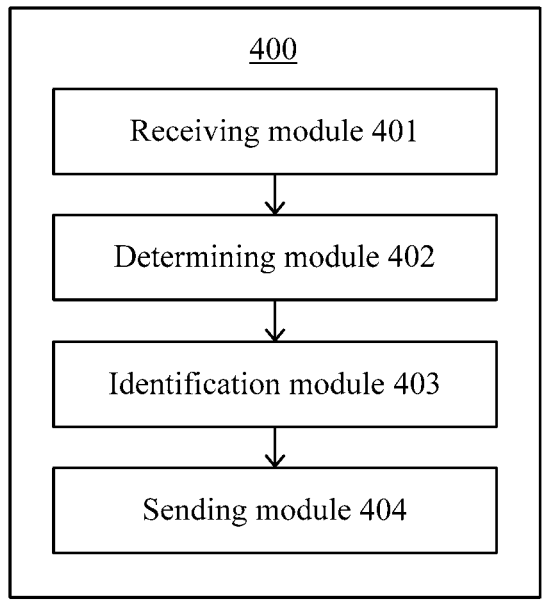
FIG. 6 is a schematic structural block diagram of a route determining apparatus 400 according to an embodiment.

Based on a same inventive concept, an embodiment further provides a route determining apparatus 400. Referring to FIG. 6, the apparatus 400 includes:

a receiving module 401, configured to receive a first packet of a first service flow;

a determining module 402, configured to determine, according to a feature field included in the packet, that the first service flow is a service flow of a first service chain;

an identification module 403, configured to add a first timestamp of the first packet and a first service chain identifier to the first packet, where the first service chain identifier indicates that the first service flow is a service flow of the first service chain, and the first timestamp indicates a creation time of the first service flow; and a sending module 404, configured to send the first packet to a switch.

In some embodiments, in this embodiment, the identification module 403 is further configured to: determine a load balancing factor of the first packet, and add the load balancing factor to the first packet.

The apparatus 400 in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the apparatus 400 in this embodiment according to the foregoing description. For conciseness of this specification, details are not described herein again.

Figure 7:
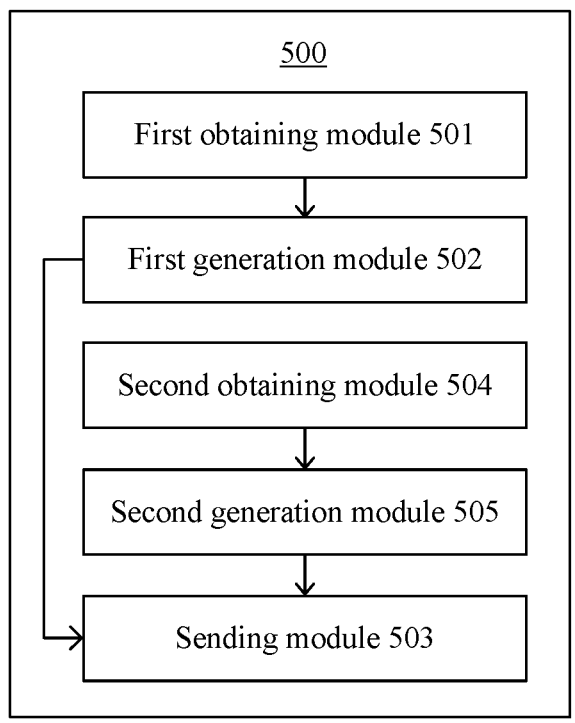
FIG. 7 is a schematic structural block diagram of a route determining apparatus 500 according to an embodiment.

Based on a same inventive concept, an embodiment further provides a route determining apparatus 500. Referring to FIG. 7, the apparatus 500 includes:

a first obtaining module 501, configured to obtain first current load of each service node existing at a first moment;

a first generation module 502, configured to generate a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node;

a sending module 503, configured to send the first flow entry to a switch;

a second obtaining module 504, configured to obtain second current load of each service node existing at a second moment; and a second generation module 505, configured to generate a second flow entry, where the second flow entry includes a second route mapping relationship of a packet of the first type of service flow, a second load ratio with respect to a full load capacity of each service node, and a second effective time period of the second flow entry, the second load proportion is generated according to the second current load of each service node, and the second effective time period is different from the first effective time period.

The sending module 503 is further configured to send the second flow entry to the switch.

The apparatus 500 in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the apparatus 500 in this embodiment according to the foregoing description. For conciseness of this specification, details are not described herein again.

Figure 8:
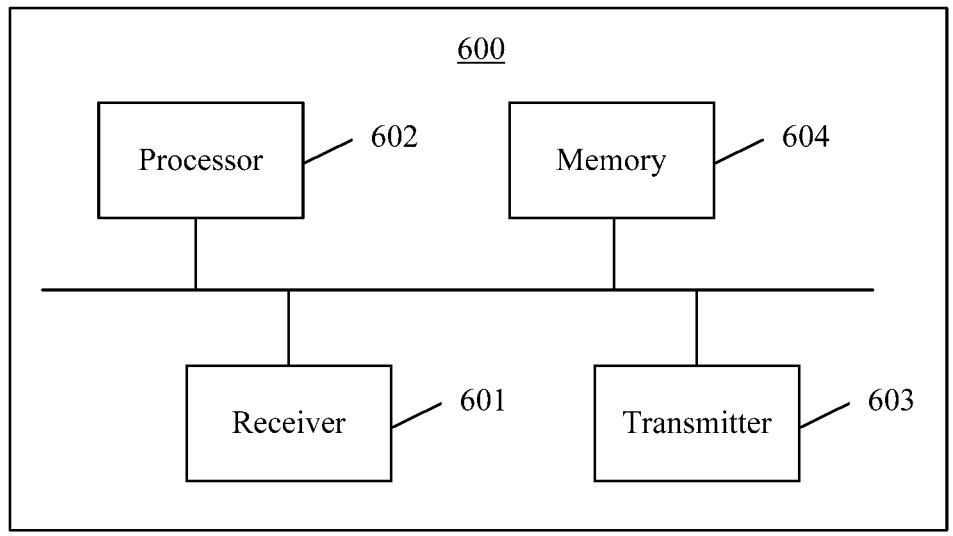
FIG. 8 is a schematic structural block diagram of a route determining device 600 according to an embodiment.

Based on a same inventive concept, an embodiment further provides a route determining device 600. Referring to FIG. 8, the device 600 includes:

a receiver 601, configured to: receive a first flow entry, where the first flow entry includes a first route mapping relationship of a service flow of a first service chain, a first load ratio with respect to a full load capacity of each service node, and a first effective time period of the first flow entry; receive a second flow entry, where the second flow entry includes a second route mapping relationship of the service flow of the first service chain, a second load ratio with respect to a full load capacity of each service node, and a second effective time period of the second flow entry, and the second effective time period is different from the first effective time period; and receive a first packet of a first service flow, where the first packet includes a first timestamp of the first service flow and a first service chain identifier, the first service chain identifier indicates that the first service flow is a service flow of the first service chain, and the first timestamp indicates a creation time of the first service flow;

a processor 602, configured to: determine a time period that includes the first timestamp from the first effective time period and the second effective time period; and determine, according to a flow entry corresponding to the determined time period, a service node for receiving the first packet; and a transmitter 603, configured to send the first packet to the determined service node.

In some embodiments, in this embodiment, the processor 602 is further configured to: start a timeout timer after a first service node for receiving the first packet is determined from at least two service nodes; and before the transmitter sends a second packet to the first service node, determine that the timeout timer does not expire.

In some embodiments, in this embodiment, the time period that is determined from the first effective time period and the second effective time period and that includes the first timestamp is the first time period.

That the processor 602 is configured to determine, according to the first flow entry, the service node for receiving the first packet includes:

determining at least two service nodes according to an input node of the first packet and the first route mapping relationship;

generating a load balancing factor according to the first timestamp; and determining, from the at least two service nodes according to respective first load proportions of the at least two service nodes and the load balancing factor, a first service node for receiving the first packet.

In some embodiments, in this embodiment, the first packet further includes a load balancing factor, and the time period that is determined from the first effective time period and the second effective time period and that includes the first timestamp is the first time period.

That the processor 602 is configured to determine, according to the first flow entry, the service node for receiving the first packet includes:

determining at least two service nodes according to an input node of the first packet and the first route mapping relationship; and determining, from the at least two service nodes according to respective first load proportions of the at least two service nodes and the load balancing factor, a first service node for receiving the first packet.

In some embodiments, in this embodiment, the first packet is a head packet of the first service flow.

The receiver 601 is configured to receive a second packet of the first service flow.

The transmitter is further configured to send the second packet to the first service node.

In some embodiments, in this embodiment, the processor 602 is further configured to: start a timeout timer after the first service node for receiving the first packet is determined from the at least two service nodes; and before the transmitter sends the second packet to the first service node, determine that the timeout timer does not expire.

In some embodiments, in this embodiment, the device 600 further includes a memory 604, configured to store the received packet and flow entries.

The device 600 in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the device 600 in this embodiment according to the foregoing description. For conciseness of this specification, details are not described herein again.

Based on a same inventive concept, an embodiment further provides a route determining device, and the device includes:

a receiver, configured to receive a first packet of a first service flow;

a processor, configured to: determine, according to a feature field included in the first packet, that the first service flow is a service flow of a first service chain; and add a first timestamp of the first packet and a first service chain identifier to the first packet, where the first service chain identifier indicates that the first service flow is a service flow of the first service chain, and the first timestamp indicates a creation time of the first service flow; and a transmitter, configured to send the first packet to a switch.

In some embodiments, in this embodiment, the processor is further configured to: determine a load balancing factor of the first packet, and add the load balancing factor to the first packet.

In some embodiments, in this embodiment, the device further includes a memory, configured to store the received packet.

The device in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the device in this embodiment according to the foregoing description. For conciseness of this specification, details are not described herein again.

Based on a same inventive concept, an embodiment further provides a route determining device, and the device includes:

a receiver, configured to obtain first current load of each service node existing at a first moment;

a processor, configured to generate a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node; and a transmitter, configured to send the first flow entry to a switch.

The receiver is further configured to obtain second current load of each service node existing at a second moment.

The processor is further configured to generate a second flow entry, where the second flow entry includes a second route mapping relationship of a packet of the first type of service flow, a second load ratio with respect to a full load capacity of each service node, and a second effective time period of the second flow entry, the second load proportion is generated according to the second current load of each service node, and the second effective time period is different from the first effective time period.

The transmitter is further configured to send the second flow entry to the switch.

In some embodiments, in this embodiment, the device further includes a memory, configured to store received load information of the service node and the generated flow entries.

The device in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the device in this embodiment according to the foregoing description. For conciseness of this specification, details are not described herein again.

It should be noted that the processor may be one processing chip, or may be a collective term of multiple processing elements. For example, the processor may be a central processing unit (CPU), or may be an application-specific integrated circuit (ASIC), or may be one or more integrated circuits configured to implement this embodiment of the present disclosure, for example, one or more microprocessors (DSP) or one or more field programmable gate arrays (FPGA).

In addition, the receiver and the transmitter can be integrated together.

Figure 9:
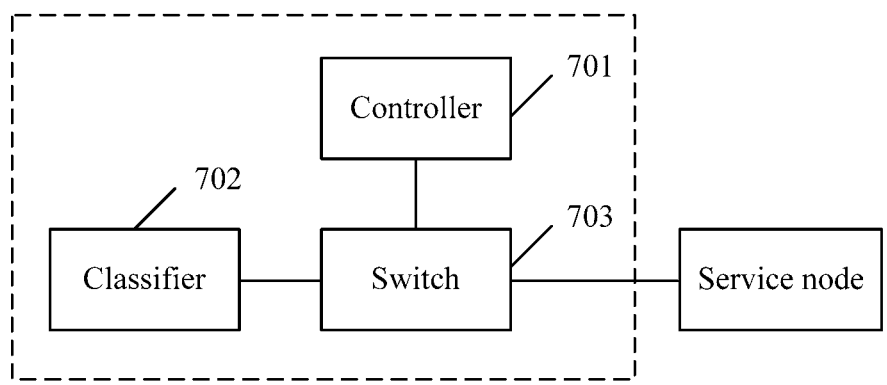
FIG. 9 is a schematic diagram of a route determining system according to an embodiment.

Based on a same inventive concept, an embodiment further provides a route determining system. Referring to FIG. 9, the system includes:

a controller 701, configured to: obtain first current load of each service node existing at a first moment; generate a first flow entry, where the first flow entry includes a first route mapping relationship of a service flow of a first service chain, a first load ratio with respect to a full load capacity of each service node, and a first effective time period of the first flow entry, and the first load proportion is generated according to the first current load of each service node; send the first flow entry to a switch; obtain second current load of each service node existing at a second moment; generate a second flow entry, where the second flow entry includes a second route mapping relationship of a packet of the first type of service flow, a second load ratio with respect to a full load capacity of each service node, and a second effective time period of the second flow entry, and the second load proportion is generated according to the second current load of each service node; and send the second flow entry to the switch, where the second effective time period is different from the first effective time period;

a classifier 702, configured to: receive a first packet of a first service flow; determine, according to a feature field included in the first packet, that the first service flow is a service flow of the first service chain; add a first timestamp of the first packet and a first service chain identifier to the first packet, where the first service chain identifier indicates that the first service flow is a service flow of the first service chain, and the first timestamp indicates a creation time of the first service flow; and send the first packet to the switch; and the switch 703, configured to: receive the first flow entry; receive the second flow entry; receive the first packet of the first service flow; determine a time period that includes the first timestamp from the first effective time period and the second effective time period; determine, according to a flow entry corresponding to the determined time period, a service node for receiving the first packet; and send the first packet to the determined service node.

In some embodiments, in this embodiment, the switch 703 is further configured to: after receiving the second flow entry, determine whether a start time of the second effective time period precedes an end time of the first effective time period; and if the start time of the second effective time period precedes the end time of the first effective time period, change the end time of the first effective time period to the start time of the second effective time period.

In some embodiments, in this embodiment, the first packet is a head packet of the first service flow.

The switch 703 is further configured to: receive a second packet of the first service flow; and send the second packet to the first service node.

The system in this embodiment and the methods corresponding to FIG. 2A and FIG. 2B to FIG. 4 are two aspects based on a same inventive concept, and an implementation process of the methods is described in detail above. Therefore, persons skilled in the art may clearly understand a structure and an implementation process of the system in this embodiment according to the foregoing description. For conciseness of this specification, details are not described herein again.

One or more technical solutions provided in the embodiments of this application have at least the following technical effects or advantages:

In the embodiments of this application, the switch receives the first flow entry and the second flow entry, and determines, according to the timestamp included in the first packet, whether to use the first flow entry or the second flow entry to determine a route for the first packet. Therefore, when a new flow entry is generated because a load status of a service node changes, the switch can immediately use the new flow entry to forward a packet of a newly created service flow, and continue to forward a packet of a previously created service flow based on a previous flow entry. Different from the prior art in which a packet is forwarded according to a new flow entry only after an existing packet is processed, in the solution provided in the embodiments of this application, the switch can adjust a routing policy in a timely manner and implement load balancing more flexibly and quickly. In addition, in the solution provided in the embodiments of this application, a flow entry is generated for a same type of service flows instead of each service flow. Therefore, there are few flow entries, system overheads are relatively low, and efficiency is relatively high.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Although some embodiments of the present disclosure have been described, persons skilled in the art can make changes and modifications to these embodiments provided that they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A route determining method, comprising:

receiving a first flow entry, wherein the first flow entry comprises a first route mapping relationship of a service flow of a first service chain, a first load ratio with respect to a full load capacity of each service node, and a first effective time period of the first flow entry;

receiving a second flow entry, wherein the second flow entry comprises a second route mapping relationship of the service flow of the first service chain, a second load ratio with respect to the full load capacity of each service node, and a second effective time period of the second flow entry, wherein the second effective time period is different from the first effective time period;

receiving a first packet of a first service flow, wherein the first packet comprises a first timestamp of the first service flow and a first service chain identifier, the first service chain identifier indicates that the first service flow is a service flow of the first service chain, and the first timestamp indicates a creation time of the first service flow;

determining, from the first effective time period and the second effective time period, a time period, the time period comprising the first timestamp;

determining, according to a flow entry corresponding to the determined time period, a service node for receiving the first packet; and sending the first packet to the determined service node.

2. The method according to claim 1, after receiving the second flow entry, the method further comprises:

determining whether a start time of the second effective time period precedes an end time of the first effective time period; and when the start time of the second effective time period precedes the end time of the first effective time period, changing the end time of the first effective time period to the start time of the second effective time period.

3. The method according to claim 1, wherein determining the service node for receiving the first packet comprises:

determining at least two service nodes according to an input node of the first packet and the first route mapping relationship;

generating a load balancing factor according to the first timestamp; and determining, from the at least two service nodes according to respective first load proportions of the at least two service nodes and the load balancing factor, a first service node for receiving the first packet.

4. The method according to claim 1, wherein the first packet further comprises a load balancing factor, and the time period that is determined from the first effective time period and the second effective time period and that comprises the first timestamp is the first effective time period; and determining the service node for receiving the first packet comprises:

determining at least two service nodes according to an input node of the first packet and the first route mapping relationship; and determining, from the at least two service nodes according to respective first load proportions of the at least two service nodes and the load balancing factor, a first service node for receiving the first packet.

5. The method according to claim 3, wherein the first packet is a head packet of the first service flow, and after determining the first service node for receiving the first packet, the method further comprises:

receiving a second packet of the first service flow; and sending the second packet to the first service node.

6. The method according to claim 5, after determining the first service node for receiving the first packet, further comprising:

starting a timeout timer; and before sending the second packet to the first service node, the method further comprising:

determining that the timeout timer does not expire.

7. A route determining device, comprising:

a receiver, configured to:

receive a first flow entry, wherein the first flow entry comprises a first route mapping relationship of a service flow of a first service chain, a first load ratio with respect to a full load capacity of each service node, and a first effective time period of the first flow entry;

receive a second flow entry, wherein the second flow entry comprises a second route mapping relationship of the service flow of the first service chain, a second load ratio with respect to the full load capacity of each service node, and a second effective time period of the second flow entry, wherein the second effective time period is different from the first effective time period; and receive a first packet of a first service flow, wherein the first packet comprises a first timestamp of the first service flow and a first service chain identifier, the first service chain identifier indicates that the first service flow is a service flow of the first service chain, and the first timestamp indicates a creation time of the first service flow;

a processor, configured to:

determine, from the first effective time period and the second effective time period, a time period, the time period comprising the first timestamp; and a transmitter, configured to send the first packet to the determined service node.

8. The device according to claim 7, wherein the processor is further configured to:

after the second flow entry is received, determine whether a start time of the second effective time period precedes an end time of the first effective time period; and when the start time of the second effective time period precedes the end time of the first effective time period, change the end time of the first effective time period to the start time of the second effective time period.

9. The device according to claim 7, wherein the processor is configured to:

determine at least two service nodes according to an input node of the first packet and the first route mapping relationship;

generate a load balancing factor according to the first timestamp; and determine, from the at least two service nodes according to respective first load proportions of the at least two service nodes and the load balancing factor, a first service node for receiving the first packet.

10. The device according to claim 7, wherein the first packet further comprises a load balancing factor, and the time period that is determined from the first effective time period and the second effective time period and that comprises the first timestamp is the first effective time period; and the processor is configured to:

determine at least two service nodes according to an input node of the first packet and the first route mapping relationship; and determine, from the at least two service nodes according to respective first load proportions of the at least two service nodes and the load balancing factor, a first service node for receiving the first packet.

11. The device according to claim 9, wherein the first packet is a head packet of the first service flow;

the receiver is further configured to receive a second packet of the first service flow; and the transmitter is further configured to send the second packet to the first service node.

12. The device according to claim 11, wherein the processor is further configured to:

start a timeout timer after the first service node for receiving the first packet is determined from the at least two service nodes; and before the transmitter sends the second packet to the first service node, determine that the timeout timer does not expire.

13. A route determining system, comprising:

a controller, configured to:

obtain first current load of each service node existing at a first moment;

generate a first flow entry, wherein the first flow entry comprises a first route mapping relationship of a service flow of a first service chain, a first load ratio with respect to a full load capacity of each service node, and a first effective time period of the first flow entry, wherein the first load ratio is generated according to the first current load of each service node;

send the first flow entry to a switch;

obtain second current load of each service node existing at a second moment;

generate a second flow entry, wherein the second flow entry comprises a second route mapping relationship of a packet of a first type of service flow, a second load ratio with respect to the full load capacity of each service node, and a second effective time period of the second flow entry, wherein the second load ratio is generated according to the second current load of each service node; and send the second flow entry to the switch, wherein the second effective time period is different from the first effective time period;

a classifier, configured to: receive a first packet of a first service flow;

determine, from the first effective time period and the second effective time period, a time period, the time period comprising the first timestamp;

add a first timestamp of the first packet and a first service chain identifier to the first packet, wherein the first service chain identifier indicates that the first service flow is a service flow of the first service chain, and the first timestamp indicates a creation time of the first service flow; and send the first packet to the switch; and the switch, configured to:

receive the first flow entry;

receive the second flow entry;

receive the first packet of the first service flow;

determine a time period that comprises the first timestamp from the first effective time period and the second effective time period;

determine, according to a flow entry corresponding to the determined time period, a service node for receiving the first packet; and send the first packet to the determined service node.

14. The system according to claim 13, wherein the switch is further configured to: after receiving the second flow entry, determine whether a start time of the second effective time period precedes an end time of the first effective time period; and when the start time of the second effective time period precedes the end time of the first effective time period, change the end time of the first effective time period to the start time of the second effective time period.

15. The system according to claim 13, wherein the first packet is a head packet of the first service flow; and the switch is further configured to:

receive a second packet of the first service flow; and send the second packet to a first service node.

* * * * *